United States Patent Office 3,128,299
Patented Apr. 7, 1964

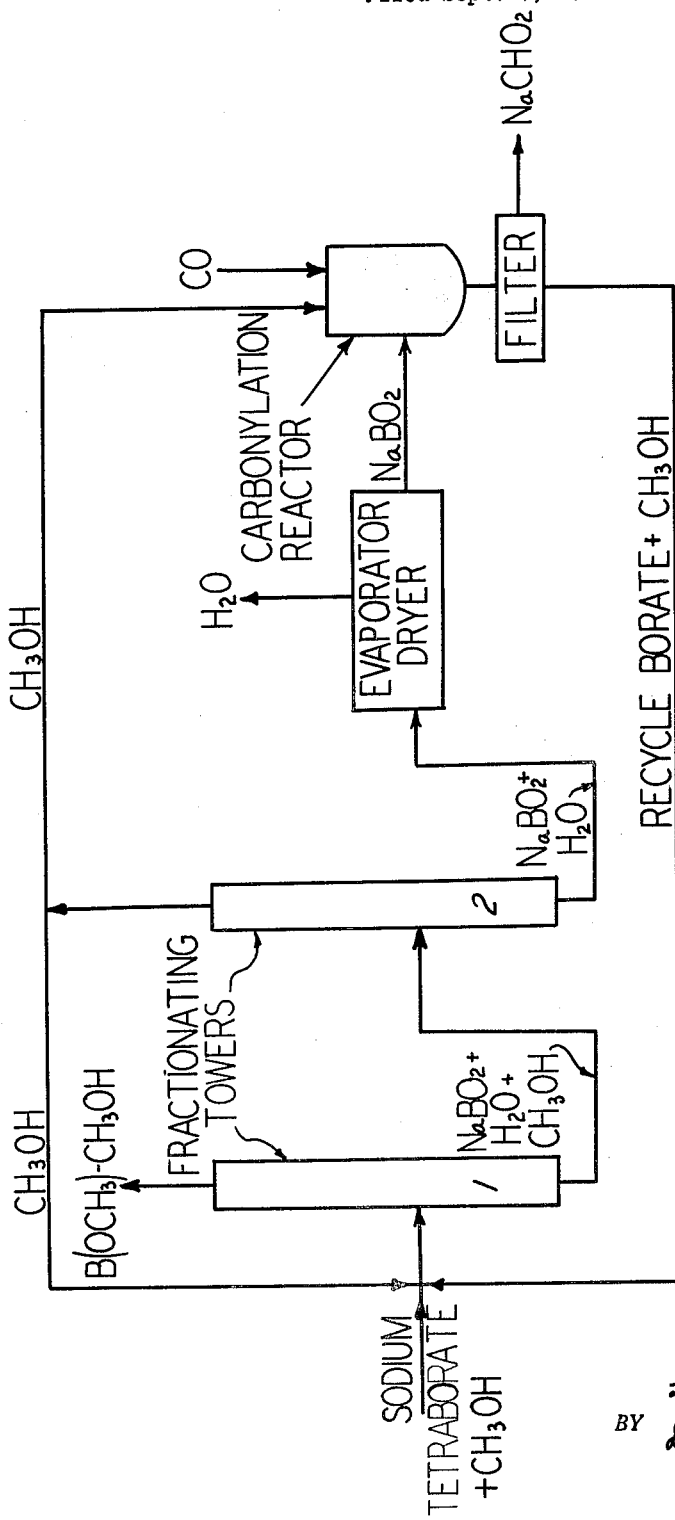

3,128,299
PREPARATION OF TRIMETHYLBORATE
Lawrence J. Edwards, Zelienople, Pa., assignor to Callery Chemical Company, Pittsburgh, Pa., a corporation of Pennsylvania
Filed Sept. 9, 1957, Ser. No. 682,940
6 Claims. (Cl. 260—462)

This invention relates to a method of preparing trimethylborate, $B(OCH_3)_3$, and more particularly to a method for its preparation from sodium borates, methanol and carbon monoxide.

Trimethylborate has been prepared from reactions of boric oxide or boric acid with excess methanol or the reaction of a borate salt with a strong acid and methanol. The main disadvantage of these methods is that the starting materials are not as readily available or as cheap as the sodium borate salts or naturally occurring sodium borate ores. It was recently discovered (May, Ser. No. 471,172, filed November 26, 1954, of common ownership with this application, now abandoned) that methanol would react directly with sodium borates and sodium borate ores that are more acid than sodium metaborate to produce methyl borate and byproduct sodium metaborate, e.g. anhydrous borax reacts according to the equation, $$2Na_2B_4O_7 + 12CH_3OH = 4B(OCH_3)_3 + 4NaBO_2 + 6H_2O$$

Borate salts may be considered as addition products of a metal oxide and boric oxide; the metal oxide is the alkaline constituent and boric oxide is the acidic constituent. Thus sodium tetraborate, $Na_2B_4O_7$, containing 2 moles of $B_2O_3$ for each mole of $Na_2O$ is more acidic than sodium metaborate, $NaBO_2$, which contains only one mole of $B_2O_3$ for each mole of $Na_2O$. In order of increasing acidity the sodium borates are $NaBO_2$, $Na_2B_4O_7$, $NaB_3O_5$, $Na_2B_6O_{13}$, $NaB_5O_8$, and $Na_2B_{12}O_{19}$. The term acidity is used throughout the specification and claims as a relative term, as all the sodium borates are basic, e.g., sodium tetraborate is basic but it is more acidic, or less basic, than sodium metaborate. Any sodium borate salt containing more than one atom of boron for each atom of sodium will react with methanol to give methyl borate and sodium metaborate; however, only a portion of the boron in the starting borate is converted to methyl borate. For example, when sodium tetraborate and methanol are reacted only one-half of the boron is converted to methyl borate and the remainder goes to byproduct sodium metaborate.

It is an object of this invention to provide a method of preparing methyl borate from sodium metaborate.

It is a further object of this invention to provide a method of preparing methyl borate from sodium tetraborate salts and ores in which more than fifty percent of the boron is converted to methyl borate.

It is another object to provide a cyclic process for preparing methyl borate from sodium borate salts and ores that converts all the boron to methyl borate.

A further object is to provide an inexpensive method of preparing methyl borate from sodium borates that also produces the valuable byproduct, sodium formate.

The accompanying drawing, to be taken as a part of this specification, schematically illustrates a preferred process for the production of methyl borate according to this invention.

This invention is predicated on the discovery that carbon monoxide reacts with methanol solutions of sodium metaborate to produce sodium formate and methanol solutions of more acidic sodium borates from which methyl borate can be recovered, and that carbon monoxide reacts with methanol solutions of sodium tetraborate to produce sodium formate and a methanol solution of a sodium borate more acidic than sodium tetraborate from which an increased yield of methyl borate can be obtained.

Methyl borate can be distilled from a mixture of an acid borate salt, i.e., more acidic than sodium metaborate, and excess methanol leaving a residue of sodium metaborate. Thus for example, when an 11% borax pentahydrate solution in methanol is introduced as a feed solution into a center feed column having six theoretical plates above the feed plate and fourteen theoretical plates below the feed plate with the column operating at a reflux ratio of 12:1, about 50% of the boron in the feed solution is converted to trimethylborate. The trimethylborate is removed from the column as trimethylborate-methanol azeotrope in the overhead product leaving a mixture of sodium metaborate, water and methanol in the bottom liquor. However, the distillation of a solution of sodium metaborate and methanol gives no reaction and produces no trimethylborate.

According to this invention a methanol solution of sodium metaborate or a hydrate of sodium metaborate is treated with carbon monoxide and sodium formate precipitates producing a methanol solution of a borate salt more acidic than sodium metaborate. The methanol solution, produced thereby is distilled, and methyl borate-methanol azeotrope is produced as the overhead distillation product leaving a mixture of sodium metaborate, methanol and water.

The following example illustrates this reaction. A saturated solution of sodium metaborate in methanol was placed in a 175 milliliter stainless steel autoclave and carbon monoxide was added until the total pressure reached 600 p.s.i.g. There was an immediate pressure drop indicating that some reaction with the carbon monoxide occurred at room temperature. The autoclave was then heated to 100° C. for several hours or until the pressure became constant. The reactant mixture was then cooled to room temperature and the excess carbon monoxide was vented through a condenser which returned any condensible vaporized material to the autoclave. The contents of the autoclave were washed into a flask with about 100 milliliters of methanol. The reaction product and washings were distilled nearly to dryness and the distillate was analyzed for methyl borate and 62.5% of the boron originally charged as sodium metaborate was recovered as methyl borate. The residue in the flask contained the unreacted sodium metaborate and sodium formate. One mole of sodium formate was present for each mole of methyl borate recovered.

In another reaction a saturated solution of sodium metaborate was treated with carbon monoxide at 600 p.s.i.g. and 100° C. for several hours. The reactor was cooled to room temperature, the methanol solution was filtered from the precipitated sodium formate, and the sodium formate residue was washed with additional methanol. The methanol solution and methanol wash were combined and distilled. There was recovered a 64.6% yield of methyl borate based on the total boron charged in the sodium metaborate solution. One mole of essentially pure sodium formate was recovered for each mole of methyl borate produced.

Sodium tetraborates may be treated with carbon monoxide to produce sodium formate and alcohol solutions of more acid sodium borates which give an increased yield of methyl borate on subsequent distillation. Thus for example when a saturated solution of soduim tetraborate decahydrate in methanol was distilled there was recovered 50.1% yield of methyl borate. A 58.5% yield of methyl borate was recovered from the distillation of a methanol solution produced by pretreating a sodium tetraborate decahydrate solution with carbon monoxide at 600 p.s.i.g. and 100° C. for 24 hours. Similarly a saturated solution of sodium tetraborate monohydrate was treated with carbon monoxide at 600 p.s.i.g. and 100° C. for a period of 20 hours. The reaction mixture was then distilled and 69% yield of methyl borate was recovered.

The carbonylation reaction proceeds at a higher rate at elevated temperatures and carbon monoxide pressures, and it is generally preferred to operate at temperatures in excess of about 50° C. and carbon monoxide pressures in excess of about 50 p.s.i.g. The operability of the invention is not dependent on temperature and pressure conditions, as the reaction proceeds at any carbon monoxide pressure and any temperature between ambient temperature and the critical temperature of methanol.

A preferred cyclic process for the utilization of all the boron from a sodium borate salt or sodium borate ore more acid than sodium metaborate to produce trimethylborate is schematically illustrated in the accompanying drawing. An alcohol solution of the sodium borate feed material is fed to a fractionating tower 1. In this column the mixture reacts to form trimethyl borate-methanol azeotrope which is taken off overhead, and the bottom liquor consists of methyl alcohol, sodium metaborate and water. The bottoms product is fed into a second fractionating tower 2 and the methanol is distilled overhead. The bottoms product from the second fractionating tower is an aqueous solution of sodium metaborate. This sodium metaborate solution is fed into the evaporator-dryer where the water is removed. It is not necessary to remove water of hydration from the sodium borate in the drying operation, although it is generally preferred to dry the salt to the anhydrous state. The sodium metaborate is then dissolved in methanol and treated with carbon monoxide in the carbonylation reactor. If preferred a separate dissolver and reactor may be used. In this reactor there is produced a precipitate of sodium formate and a methanol solution of a borate salt more acid than sodium metaborate. This slurry is filtered to separate the sodium formate, and the filtrate is returned, admixed with the alcohol-borate feed, and reused. Thus, in the cyclic process, sodium borate salt or the sodium borate ore, alcohol and carbon monoxide are consumed and trimethylborate and sodium formate are produced.

While several embodiments of this invention have been described it is to be understood that within the scope of the claims appended hereto this invention may be practiced otherwise than as specifically described. Having thus described this invention and the manner by which it is to be performed what is desired to be claimed and secured by Letters Patent of the United States is:

1. A method of preparing methyl borate which comprises contacting carbon monoxide and a methanol solution of a compound selected from the group consisting of sodium metaborate, sodium tetraborate and hydrates thereof, and distilling methyl borate from the resultant reaction mixture.

2. A method of preparing methyl borate which comprises contacting carbon monoxide and a methanol solution of a compound selected from the group consisting of sodium metaborate, sodium tetraborate and hydrates thereof, separating the methanol solution of sodium borate salt from the resulting reaction mixture, and distilling methyl borate from said solution.

3. A method according to claim 2 in which the sodium metaborate is anhydrous sodium metaborate.

4. A cyclic method of producing methyl borate that comprises distilling a methanol solution of a compound selected from the group consisting of sodium borates more acid than sodium metaborate, hydrates thereof, and mixtures thereof, recovering the trimethyl borate overhead, removing a bottom liquor of sodium metaborate, water and methanol, separating the sodium metaborate from the water and methanol, dissolving the sodium metaborate in methanol, contacting the methanol solution of sodium metaborate with carbon monoxide, separating the sodium formate produced thereby, and recycling the resultant sodium borate solution in methanol for further reaction.

5. A method according to claim 4 in which the sodium borate is sodium tetraborate.

6. A cyclic method of producing methyl borate that comprises distilling a methanol solution of sodium tetraborate, recovering the trimethyl borate overhead, removing a bottom liquor of sodium metaborate, water and methanol, evaporating the methanol from the bottom liquor and recycling the same for further reaction with the sodium borate, evaporating the water from the sodium metaborate bottoms liquor, dissolving the sodium borate in methanol, contacting the methanol solution of sodium metaborate with carbon monoxide, separating the sodium formate produced thereby, and recycling the resultant sodium borate solution in methanol for further reaction.

No references cited.